United States Patent [19]

Huber-Emden et al.

[11] 3,996,281
[45] Dec. 7, 1976

[54] FLUORINATED CARBOXYLIC ACID AMIDES AND POLYMERIZATION PRODUCTS THEREOF

[75] Inventors: Helmut Huber-Emden, Basel; Paul Schafer, Riehen, both of Switzerland

[73] Assignee: Ciba-Geigy Corporation, Ardsley, N.Y.

[22] Filed: Feb. 6, 1975

[21] Appl. No.: 547,530

[30] Foreign Application Priority Data

Feb. 12, 1974 Switzerland .................... 1927/74

[52] U.S. Cl. .................... 260/561 N; 8/115.5; 252/8.8; 526/248; 526/312; 526/336; 526/347; 526/345; 526/350

[51] Int. Cl.² .................... C07C 103/133

[58] Field of Search ..... 260/561 N, 89.7 R, 80.3 N, 260/88.1 PN, 87.5 A

[56] References Cited

UNITED STATES PATENTS

| | | | |
|---|---|---|---|
| 2,743,297 | 4/1956 | Husted et al. | 260/89.7 R |
| 2,957,914 | 10/1960 | Halpern et al. | 260/561 N |
| 3,428,709 | 2/1969 | Kleiner | 260/561 N |
| 3,475,434 | 10/1969 | Knell | 260/561 N |
| 3,549,705 | 12/1970 | Domba | 260/561 N |
| 3,655,732 | 4/1972 | Rondestvedt | 260/486 H |
| 3,658,843 | 4/1972 | Kleiner | 260/89.7 R |
| 3,729,456 | 4/1973 | Hoke | 260/561 N |

FOREIGN PATENTS OR APPLICATIONS

1,532,284  7/1968  France
594,585  1956  Italy .................... 260/561

*Primary Examiner*—Arthur P. Demers
*Attorney, Agent, or Firm*—Joseph G. Kolodny; Edward McC. Roberts; Prabodh I. Almaula

[57] ABSTRACT

New fluorinated carboxylic acid amides of the formula

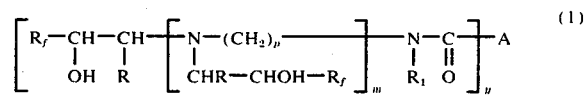

are provided wherein $R_f$ is a perfluoroalkyl radical with 1 to 18 carbon atoms, R is hydrogen or methyl, $R_1$ is hydrogen or $R_fCHOHCHR-$, if $m$ is 1, and hydrogen, alkyl with 1 to 18 carbon atoms, cycloalkyl with 5 or 6 carbon atoms, hydroxyalkyl with 2 to 6 carbon atoms, alkoxyalkyl with 1 to 4 carbon atoms in the alkoxy moiety or $R_fCHOHCHR-$, if $m$ is 0, A is an ethylenically unsaturated hydrocarbon radical with 2 or 3 carbon atoms, $m$ is 0 or 1, $y$ is 1 or 2 and $p$ is an integer from 2 to 6. The fluorinated carboxylic acid amides are useful e.g. as wetting agents, emulsifiers or dispersants and for producing oil-repellent finishes on porous or nonporous substrates or as intermediates for the manufacture of homo- or copolymers, which show also oil-repellent properties.

26 Claims, No Drawings

FLUORINATED CARBOXYLIC ACID AMIDES AND POLYMERIZATION PRODUCTS THEREOF

The present invention provides fluorinated carboxylic acid amides of the formula

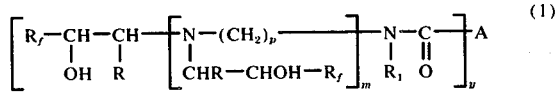
(1)

wherein $R_f$ is a perfluoroalkyl radical with 1 to 18 carbon atoms, R is hydrogen or methyl, $R_1$ is hydrogen or $R_f$CHOHCHR—, if m is 1, and hydrogen, alkyl with 1 to 18 carbon atoms, cycloalkyl with 5 to 6 carbon atoms, hydroxyalkyl with 2 or 6 carbon atoms, alkoxyalkyl with 1 to 4 carbon atoms in the alkoxy moiety or $R_f$CHOHCHR—, if m is O, A is an ethylenically unsaturated hydrocarbon radical with 2 or 3 carbon atoms, m is 0 or 1, y is 1 or 2 and p is an integer from 2 to 6.

The perfluorinated alkyl radical can be, for example, a straight-chain or a branched perfluoralkyl radical with 4 to 14, preferably with 6 to 12, carbon atoms and has, for example the following formulae:

| | |
|---|---|
| $F(CF_2)_p$— | $p = 4 - 14$ |
| $(CF_3)_2CF(CF_2)_q$— | $q = 1 - 11$ |
| $CF_3[CF_2CF(CF_3)]_r$— | $r = 1 - 4$ |
| $(CF_3)_2CF[CF_2CF(CF_3)]_s$— | $s = 1 - 3$ |

ω-H-perfluoroalkyl radicals are also possible. The radical $R_1$ can be hydrogen or straight-chain or branched alkyl with 1 to 18, preferably 1 to 8, carbon atoms, for example methyl, ethyl, propyl, isopropyl, butyl, hexyl, octyl, isooctyl, decyl, dodecyl, tetradecyl, hexadecyl or octadecyl, and can also be cyclopentyl or cyclohexyl or a hydroxyalkyl radical, such as —$CH_2H_4OH$, —$C_3H_6OH$, —$C_4H_8OH$, —$C_5H_{10}OH$ or —$C_6H_{12}OH$ or alkoxyalkyl, such as —$CH_2CH_2OCH_3$, —$CH_2CH_2OC_2H_5$ or —$CH_2CH_2OC_4H_9$, and furthermore

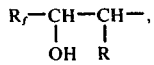

wherein $R_f$ and R have the meannings already assigned to them.

A is an ethylenically unsaturated hydrocarbon radical which is derived from monocarboxylic or dicarboxylic acids, for example acrylic acid, methacrylic acid, vinylacetic acid, crotonic acid, maleic acid, fumaric acid, mesaconic acid, citraconic acid, itaconic acid and methylenemalonic acid. Acrylic, methacrylic and fumaric acid are preferably, y is 1 or 2 and depends on the number of carboxy groups of the acids used.

Especially suitable fluorinated carboxylic acid amides according to formula (1) have the formula

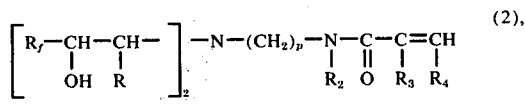
(2), wherein $R_f$ is a perfluoralkyl radical with 1 to 18 carbon atoms, R and $R_3$ are hydrogen or methyl, $R_4$ represents hydrogen, methyl or ($R_f$CHOHCHR$)_2$N(CH$_2$)$_p$NR$_2$CO—, $R_2$ is hydrogen or $R_f$CHOHCHR- and p is an integer from 2 to 6.

Preferred compounds are also those of the formulae

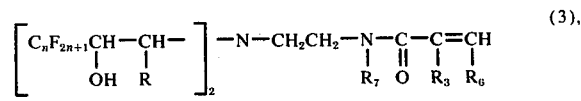
(3), wherein R and $R_3$ are hydrogen or methyl, $R_6$ is hydrogen or $(C_nF_{2n+1}CHOHCHR)_2NCH_2CH_2NR_7CO$—, $R_7$ is hydrogen or $C_nF_{2n+1}CHOHCHR$— and n is an integer from 4 to 14, and

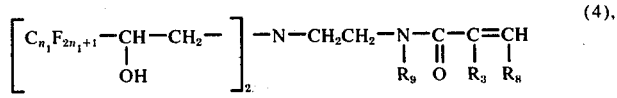
(4), wherein $R_3$ is hydrogen or methyl, $R_8$ is hydrogen or $[C_{n_1}F_{2n_1+1}CHOHCH_2]_2NCH_2CH_2NR_9CO$— and $R_9$ is hydrogen or $C_{n_1}F_{2n_1+1}CHOHCH_2$— and $n_1$ is an integer from 6 to 12.

Compounds having an interesting utility are also those of the formulae

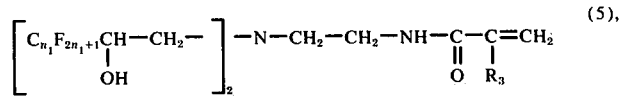
(5), and

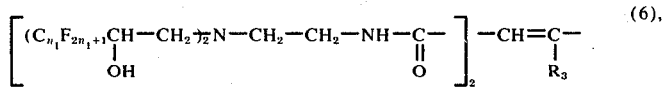 (6), wherein $R_3$ is hydrogen or methyl and $n_1$ is an integer from 6 to 12. If in formula (1) m is 0, there are obtained as particularly suitable fluorinated carboxylic acid amides the compounds of the formula

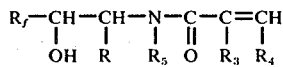 (7), wherein $R_f$ is a perfluoroalkyl radical with 1 to 18 carbon atoms, R and $R_3$ are hydrogen or methyl, $R_4$ is hydrogen, methyl or $R_fCHOHCHRNR_5CO-$ and $R_5$ is hydrogen, alkyl with 1 to 12 carbon atoms, hydroxyalkyl with 2 to 6 carbon stoms, cycloalkyl with 5 or 6 carbon atoms or $R_fCHOHCHR-$.

Preferred compounds are also those of the formulae

 (8), wherein R and $R_3$ are hydrogen or methyl, $R_{10}$ is hydrogen, alkyl with 1 to 18 carbon atoms, hydroxyalkyl with 2 to 6 carbon atoms, cycloalkyl with 5 or 6 carbon atoms or $C_nF_{2n+1}-CHOHCHR-$, $R_{11}$ is hydrogen or $C_nF_{2n+1}CHOHCHRNR_{10}CO-$ and n is an integer from 4 to 14, and

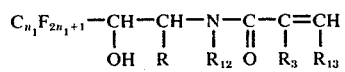 (9), wherein R and $R_1$ are hydrogen or methyl, $R_{12}$ is hydrogen, alkyl alkyl with 1 to 8 carbon atoms, $-CH_2CH_2OH$ or $C_{n_1}F_{2n_1+1}CHOHCHR-$, $R_{13}$ is hydrogen or $C_{n_1}F_{2n_1+1}CHOHCHRNR_{12}CO-$ and $n_1$ is an integer from 6 to 12.

Compounds having a particularly interesting utility are also those of the formulae

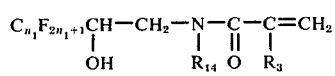 (10),

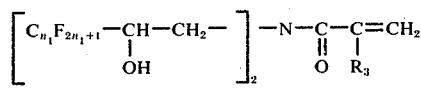 (11), and

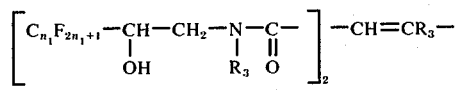 (12), wherein $R_3$ is hydrogen or methyl, $R_{14}$ is hydrogen or alkyl with 1 to 8 carbon atoms, and $n_n$ is an integer from 6 to 12.

The present invention also provides a process for the manufacture of the fluorinated carboxylic acid amides according to the invention. The process for the manufacture of the fluorinated carboxylic acid amides of the formula (1) consists in reacting fluorinated amines of the formula

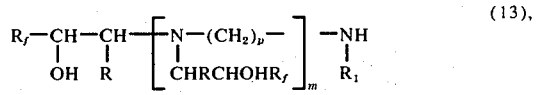 (13), wherein $R_f$, R, $R_1$, m and p have the meanings already assigned to them, with carboxylic anhydrides or carboxylic halides of $\alpha,\beta$-unsaturated monocarboxylic or dicarboxylic acids.

The fluorinated amines to be used according to the invention can be obtained for example by reaction of perfluoroalkyl epoxides of the formula

 (14)

or of perfluoroalkyl chlorohydrins of the formula

 (15)

with amines of the formula

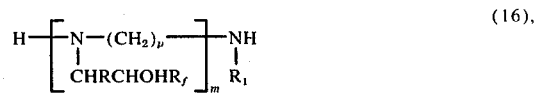 (16), whrein $R_f$, R, $R_1$, m and p have the meanings previously assigned to them. The perfluoroalkyl epoxides and chlorohydrins are known, for example, from German Offenlegungsschrift 2 160 783. German Offenlegungsschrift 2 337 780 describes amines of the formula (16).

The acid derivatives used for the manufacture of the acid amides, for example anhydrides or halides, are derived from unsaturated acids of the formula

 $A(COOH)_s$ (17)

wherein A represents an ethylenically unsaturated hydrocarbon radical which is derived from acrylic, methacrylic, crotonic, vinyl acetic, fumaric, maleic, citraconic, mesaconic, itaconic or methylenemalonic acid and s is 1 or 2. Acrylic, methacrylic and fumaric acid derivatives are preferred. The reaction may be carried out in the presence of inorganic or organic, preferably nitrogen-containing, bases. Tertiary amines, for example trimethylamine, triethylamine, tributylamine, pyridine and dimethyl aniline are especially suitable.

Possible solvents are those which are inert to the reactants, i.e. which do not interfere adversely with the reaction, for example aromatic substances like benzene and toluene, or ethers, for example diethyl ether, dimethoxy ethane, dioxan or tetrahydrofuran.

In general, the reaction of the acid chlorides with the fluorinated amines is preferred, since the acid chlorides are readily accessible and the amide formation proceeds rapidly and at low temperatures, for example between 0° C and 100° C. Exceptions are, of course, maleyl chloride and chloromaleyl chloride, which do not exist.

In the manufacture of methylenemalonic amides it is normally necessary to carry out a two-step process. First the malonic derivatives are manufactured as intermediates of the described reaction and form these the methylenemalonic amides ae obtained, for example by condensation of the malonic derivtives with formaldehyde (cf. E. Haworth and W. H. Perkin, J. Chem. Soc. 73, 339–345 (1898).

The fluorinated carboxylic acid amides according to the invention contain a carbon-to-carbon double bond, so that they can be homopolymerised or copolymerised with other ethylenically unsaturated copolymerisable compounds.

Homopolymers therefore contain recurring units of the formula $$\left[ \begin{array}{c} R_f\text{—CH—CH—} \\ | \quad\quad | \\ OH \quad R \end{array} \left[ \begin{array}{c} \text{—N—}(CH_2)_p\text{—} \\ | \\ CHRCHOHR_f \end{array} \right]_m \begin{array}{c} \text{—N—C—} \\ | \quad || \\ R_1 \quad O \end{array} \right]_y A' \quad (18),$$

wherein $R_f$ is a perfluoroalkyl radical with 1 to 18 carbon atoms, R is hydrogen or methyl, $R_1$ is hydrogen or $R_f CHOHCHR-$, if m is 1, and hydrogen, alkyl with 1 to 18 carbon atoms, cycloalkyl with 5 or 6 carbon atoms, hydroxyalkyl with 2 to 6 carbon atoms, alkoxyalkyl with 1 to 4 carbon atoms in the alkoxy moiety or $R_f CHOHCHR-$, if m is O,

is a recurring radical which is derived from an ethylenically unsaturated hydrocarbon radical with 2 or 3 carbon atoms, m is 0 or 1, y is 1 or 2 and p is an integer from 2 to 6.

Preferably, the homopolymers contain recurring units of the formulae

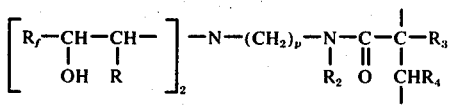

wherein $R_f$ is a perfluoroalkyl radical with 1 to 18 carbon atoms, $R_2$ is hydrogen or $R_f CHOHCHR-$, R and $R_3$ is hydrogen or methyl, $R_4$ is hydrogen, methyl or $(R_f CHOHCHR)_2 N(CH_2)_p NR_2 CO-$ and p is an integer from 2 to 6, or

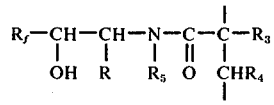

wherein $R_f$ is a perfluoroalkyl radical with 1 to 18 carbon atoms, R and $R_3$ are hydrogen or methyl, $R_4$ is hydrogen, methyl or $R_f CHOHCHRNR_5 CO-$ and $R_5$ is hydrogen, alkyl with 1 to 12 carbon atoms, hydroxyalkyl with 2 to 6 carbon atoms, cycloalkyl with 5 or 6 carbon atoms or $R_f CHOHCHR-$.

In addition to the indicated units for the homopolymers, the copolymers contain recurring units of other ethylenically unsaturated copolymerisable compounds. The number of recurring units can be about 10 to 400.

The polymerisation of the monomeric fluorinated carboxylic acid amides can take place in solution or in emulsion and in the presence of catalysts that generate free radicals with themselves, with another fluorinated carboxylic acid amide according to the invention, or with other compounds that can be polymerised to give linear polymers.

Examples of suitable compounds for the copolymerisation with the fluorinated carboxylic acid amides are:

a. vinyl esters of organic carboxylic acids, e.g. vinyl acetate, vinyl formiate, vinyl butyrate, vinyl benzoate, b. vinyl alkyl ketones and vinyl alkyl ethers, such as vinyl methyl ketone and vinyl butyl ether, c. vinyl halides, such as vinyl chloride, vinyl fluoride, vinylidene chloride, d. vinylpyrrodidione, e. vinyl aryl compounds, e.g. styrene and substituted styrenes, f. derivatives of the acrylic acid class, e.g. acrylic nitrile or acrylic amide preferably derivatives substituted at the amide nitrogen, e.g. N-methylolacrylamide, N-methylolacrylic amide alkyl ether, N,N-dihydroxyethylacrylic amide, N-tert.butyl-acrylic amide and hexametholylmelamine triacrylic amide, and the corresponding quaternised compounds, g. esters of the acrylic acid class, e.g. esters of acrylic acid, methacrylic acid, α-chloroacrylic acid, crotonic acid, maleic acid, fumaric acid or itaconic acid, and mono- or dialcohols containing from 1 to 18 carbon atoms, or phenols, e.g. ethyl acrylate, glycidyl acrylate, butylacrylate, acrylic acid monoglycol ester, dodecylacrylate, or N-dialkylaminoethylmethacrylate and the corresponding quaternised compound, and h. polymerisable olefins, such as isobutylene, butadiene or 2-chlorobutadiene.

Preferably there are used esters, amides or methylol amides of acrylic or methacrylic acid, such as ethyl acrylate, butyl acrylate, glycidal acrylate, glycolmonoacrylate, also calcium acrylate, acrylic amide, methacrylate, methacrylic amide, N-methylolacrylic amide, N-methylolacrylic amide methyl ether, N-tert.butylacrylic amide; vinyl esters of organic carboxylic acids, such as vinyl acetate; styrene, vinyl halides, such as vinyl chloride or vinylidene chloride; or polymerisable olefins, such as isobutylene.

The polymers are composed as a rule of 5 to 100, preferably of 40 to 98, percent by weight of a fluorinated carboxylic acid amide and of 95 to 0, preferably 60 to 2, percent by weight of another compound. Those bi-, ter- and quaterpolymers that, in addition to 40 to 98 percent by weight of the monomer carboxylic acid perfluoroalkyl ester, based on the weight of the monomer, contain a reactive monomer, such as N-methylolacrylic amide, an acrylic ester, such as decylacrylate, and optionally a vinyl ester, such as vinyl acetate, possess particularly interesting properties in respect of their utility.

The manufacture of the polymers by homopolymerisation or copolymerisation of fluorinated carboxylic acid amides with one or more other copolymerisable ethylenically unsaturated monomers is carried out by conventional methods, for example by block polymerisation, bead polymerisation, in aqueous emulsion, or preferably by solvent polymerisation in a solvent suitable for this purpose, e.g. acetone, benzene, sym. dichloroethane, ethyl acetate, or trifluoromethylbenzene.

The polymerisation is effected advantageously with heating, preferably to the boiling temperature of the solvent and accompanied by the addition of catalysts that form peroxidic or other free radicals and are soluble in the reaction medium, e.g. benzoyl peroxide, lauroyl peroxide, $\alpha,\alpha'$-azobisisobutyrodinitrile or potassium peroxide disulphate or redox systems, e.g. potassium peroxide disulphate/sodium bisulphite or ferrosulphate.

Depending on the nature of the polymerisation conditions and of the monomer starting materials used, the polymer compounds are obtained in the form of viscous solutions, granules, or emulsions.

It is furthermore also possible to carry out the polymerisation of the monomer compounds in the presence of substrates. For example, it can be carried out on glass fibre fabrics or textile material. In this case the respective substrate is advantageously impregnated with solutions or emulsions of the monomers and subsequently the polymerisation is effected by addition of a polymerisation catalyst by heating the material.

The preferred polymerisation processes are emulsion polymerisation in an aqueous medium and solvent polymerisation.

The polymerisation is preferably carried out with a reaction time that is so adjusted that a virtually quantitative conversion of the monomer into the polymer is attained. The maximum reaction time depends on the catalyst used and the polymerisation temperature and also on other conditions, but it is generally in the range from 0.5 to 24 hours.

The polymerisation temperature depends in turn on the chosen catalyst. In the case of emulsion polymerisation in aqueous medium it is in general in the range from 20° to 90° C. Wherever possible, the polymerisation is carried out at atmospheric pressure.

In the emulsion polymerisation, the monomer(s) to be polymerised is (are) polymerised jointly in an aqueous solution of an emulsifier under nitrogen to a given monomer concentration of about 5 to about 50%. Normally the temperature is raised to 40° to 70° C in order to effect the polymerisation in the presence of an added catalyst. The concentration of the polymerisation catalyst is generally between 0.1 and 2%, based on the weight of the monomers.

Suitable emulsifiers are cationic, anionic, or non-ionic surfactants. The hydrophobic constituent of the emulsifier can be a hydrocarbon or a fluorinated hydrocarbon.

Suitable cationic emulsifiers are, for example, quaternary ammonium salts or amine salts that contain at least one long-chain alkyl or fluoroalkyl group, or a benzene or naphthalene group that is highly substituted with alkyl to yield the hydrophobic constituent.

Further suitable emulsifiers are the non-ionic surfactants in which the hydrophilic constituent is a poly(ethoxy) group and the hydrophobic constituent is either a hydrocarbon or a fluorinated hydrocarbon group, e.g. the ethylene oxide condensates of alkylphenols, alkanols, alkylamines, alkylthiols, alkylcarboxylic acids, fluoroalkylcarboxylic acids, fluoroalkylamides and the like. Anionic emulsifiers are, for example, the sulphuric acid or phosphoric acid esters of the cited ethylene oxide condensates of long-chain alkylphenols, fatty alcohols, and fatty amines.

In the solvent polymerisation, the monomer(s) is (are) dissolved in a suitable solvent, such as fluorinated solvents, for example hexafluoroxylene, benzotrifluoride, or mixtures thereof with acetone and/or ethyl acetate, and polymerised in a reaction vessel accompanied by the use of initiators such as azobisisobutyronitrile or other azo initiators, in concentrations of 0.1 to 2%, at 40 to 100° C under nitrogen.

Preferred solvents are hexafluoroxylene, benzotrifluoride, fluorinated hydrocarbons, other fluorinated solvents and the like.

As stated at the outset, valuable copolymers with other ethylenically unsaturated monomers are obtained in the polymerisation of the new monomers in addition to homopolymers.

The fluorinated carboxylic acid amides according to the invention can be used e.g. for producing oil repellent finishes on porous or non-porous substrates.

But preferably they are used as intermediates for the manufacture of homo- or copolymers. These polymers are also used for the manufacture of the cited finishes and the use thereof is preferred.

The monomeric compounds according to the invention can further be used as wetting agents, emulsifiers, dispersants, extenders, foaming agents, dirt repellent additives for oils and lubricants for the prevention of wear and corrosion.

Examples of textile materials that can be preferably treated with the monomeric or polymeric fluorinated carboxylic acid amides are those made from natural or regenerated cellulose, such as cotton, linen, or rayon, staple fibre, or cellulose acetate. Also suitable are textiles made from wool, synthetic polyamides, polyester, or polyacrylonitrile. Blended fabrics or blended knitted fabrics from cotton/polyester fibres can also be finished with advantage. The textiles can be in the form of threads, fibres, flocks, fleeces, but preferably of woven or knitted fabrics, and can be used for example as articles of clothing, upholstery materials, finishing materials, and carpets.

Preparations that contain the monomeric or polymeric carboxylic acid amides can be applied to the substrate in the customary known manner.

The substrates are provided with an oil-repellent finish by reacting them with solutions, dispersions or emulsions of the monomeric or polymeric fluorinated carboxylic acid amides. The monomers can be applied e.g. from a solution in an organic solvent to the textile material and, after evaporation of the solvent, fixed on the fabric by heat. Polymers can be also be applied to the fabrics from suitable solvents.

Fabrics can be impregnated e.g. by the exhaustion process or on a padder that is coated with the preparation at room temperature. The impregnated material is then dried at 60° to 120° C and, if desired, subsequently subjected to a heat treatment at over 100° C, e.g. from 120° to 200° C, advantageously in the presence of known catalysts that donate acid.

Examples of further application methods are spraying, brushing, roll-coating, dusting with subsequent heat fixing or transfer of the polymers from an auxiliary material (paper, foil) accompanied by the application of heat. The compounds according to the invention are applied in amounts of 0.1 to 10, preferably 0.5 to 5, percent by weight based on the substrate.

It is also possible to apply still further agents to the substrates simultaneously with the compounds according to the invention, e.g. wetting agents, soft-handle agents, water repellents, paraffin wax emulsions, resin finishes, or agents that impart crease resistance, for example aminoplast precondensates or aminoplasts.

Besides the oil-repellent effect that is attained with the monomeric and polymeric compounds according to the invention it is also possible in particular to achieve soilrelease and antisoiling effects on textile fibre substrates: of the polymerisation products, the copolymers are particularly suitable for this purpose.

The following Examples illustrate the invention in more detail but in no wise restrict it to what is described therein. Unless indicated to the contrary, the parts and percentages are by weight.

MANUFACTURE OF THE MONOMERS

EXAMPLE 1

A mixture of 4.79 g of 1-perfluorooctyl-2-aminoethanol, 1.25 g of triethylamine and a trace of hydroquinone is stirred at 55° C in 50 ml of dioxan. With stirring, a solution of 1.09 g of acrylic acid chloride in 5 ml of dioxan is added at 55° to 60° C over the course of 10 minutes. The mixture is stirred for 1 hour at 10° C and the reaction product is filtered off with suction. The filter residue is stirred with water in order to dissolve out the triethylaminehydrochloride portion, separated from the aqueous phase, washed and dried in an exsiccator to yield 3.5 g (66% of theory) of the compound of the formula

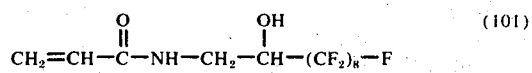
(101)

Melting point: 115° to 116° C (recrystallisation from toluene).

Analysis:
found: C 29.5 H 1.7 N 2.8. estimated: C 29.3 H 1.5 N 2.6.

EXAMPLE 2

24.2 g of 1-perfluoroalkyl-2-amino-ethanol (homologous mixture) of the formula

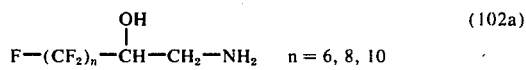
(102a)

$n = 6, 8, 10$ are dissolved in 270 ml of boiling benzene. At 65° C, 5.64 g of triethylamine and a small amount of triethylamine are added and at 65° to 70° C a solution of 4.81 g of acrylic acid chloride in 30 ml of benzene is subsequently added with stirring. The mixture is then stirred for 3 hours at room temperature, in the process of which the initially oily precipitate becomes solid. The solvent is separated, the residue is dried and stirred in 300 ml of water. After the aqueous phase has been separated, the residue is washed with water and dried in an exsiccator.

The resultant crude product (23.7 g) is recrystallised from 150 ml of toluene to yield 19.8 g (73% of theory) of the compound of the formula

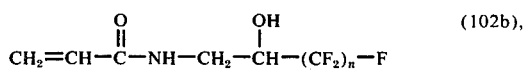
(102b), of the composition determined by gas chromatography.
$n = 6 (16\%); 8 (66\%); 10 (17\%)$.

EXAMPLE 3

4.4 g of 1-perfluorooctyl-2-methylamino-ethanol are dissolved at 65° C in 70 ml of benzene. To this solution are added 1.0 g of triethylamine, a trace of hydroquinone and then, at 60° to 65° C with stirring, a solution of 0.85 g of acrylic acid chloride in 5 ml of benzene over the course of 15 minutes. Stirring is continued for 1 hour at room temperature and precipitated triethylamine-hydrochloride is filtered off.

The filtrate is washed at 50° C with water and dried over sodium sulphate. The solvent is removed in vacuo to leave as residue 4.5 g (92% of theory) of the compound of the formula

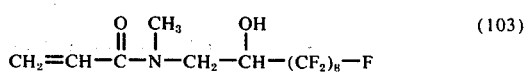
(103)

Melting point: 78° C (after recrystallisation from carbon tetrachloride).

Analysis:
found: C 30.9 H 1.9 N 2.9 H (active) 0,18. estimated: C 30.7 H 1.8 N 2.6 H (active) 0,18.

EXAMPLE 4

In analogous manner to Example 3, 59.3 g of 1-perfluoroalkyl-2-methylamino-ethanol (homologous mixture) of the formula

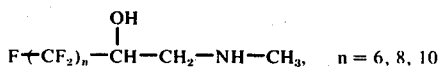

$$F\text{-}(CF_2)_n\text{-}CH(OH)\text{-}CH_2\text{-}NH\text{-}CH_3, \quad n = 6, 8, 10$$

13.4 g of triethylamine and 11.4 g of acrylic acid chloride yield the homologous mixture of the formula

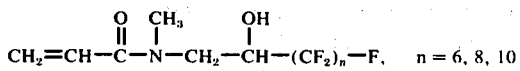

(104a), as a semi-solid mass.

Yield: 53.9 g (82% of theory).

EXAMPLE 5

A mixture of 3.30 g of bis-perfluorooctyldiethanolamine of the formula

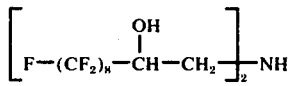

(105a), 0.39 g of triethylamine and a trace of hydroquinone is dissolved at 60° C in 50 ml of dimethoxy ethane. With stirring, a solution of 0.33 g of acrylic acid chloride in 5 ml of dimethoxy ethane is added and stirring is continued for 1 hour at room temperature. Precipitated triethylaminehydrochloride is filtered off with suction and the solvent is removed in vacuo. The oily residue becomes crystalline on being stirred with 70 ml of chloroform. It is filtered off to yield 2.9 g (83% of theory) of the compound of the formula

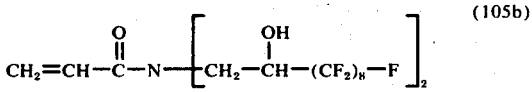

(105b)

Melting point: 100° to 120° C (after recrystallisation from chloroform).

Analysis:
found: C 27.9; H 1.3; N 1.7. estimated: C 27.8; H 1.1; N 1.4.

EXAMPLE 6

Analogously to Example 5, 14.9 g of bis-perfluoroalkyl-diethanolamine (homologous mixture) of the formula

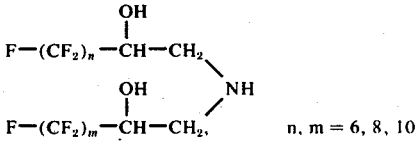

(106a), 1.77 g of triethylamine and 1.50 g of acrylic acid chloride yield 14.4 g (91% of theory) of the homologous mixture of the formula

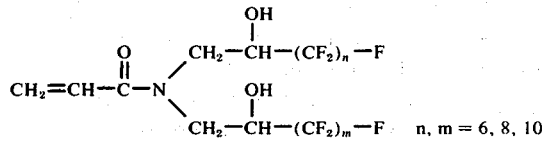

(106b)

as solid substance.

EXAMPLE 7

A mixture of 3.2 g of perfluorooctyl-diethanolamine (104b), of the formula

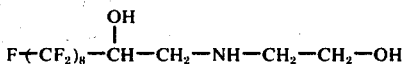

(107a), 0.68 of triethanolamine and a trace of hydroquinone is dissolved at 70° C in 100 ml of benzene. With stirring, a solution of 0.67 g of methycrylic acid chloride in 5 ml of benzene is added. The mixture is stirred for 1 hour at 70° C and then for 3 hours at room temperature. The residue is isolated, dried and stirred in 30 ml of water. After the aqueous phase has been removed, the residue is washed with water and then dried to yield 3.15 g (87% of theory) of the compound of the formula

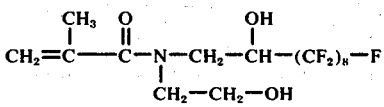

(107b)

Melting point: 103° to 104° C (recrystallised from benzene).

Analysis:
found: C 32.9; H 2.5; N 2.3. estimated: C 32.5; H 2.4; N 2.4.

EXAMPLE 8

A mixture of the ethylenediamine derivative of the formula

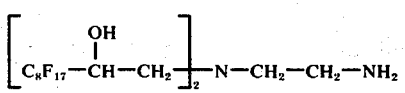

(108a)

and 0.34 g of triethylamine is dissolved in 40 ml of dimethoxy ethane. With stirring, a solution of 0.314 g of methacrylic acid chloride in 5 ml of dimethoxy ethane is added. The mixture is stirred for 1 hour, precipitated triethylamine is filtered off and the solvent is removed from the filtrate in vacuo.

The oily residue soon begins to crystallise. It is stirred in 50 ml of water, when it becomes powdery, separated from the aqueous phase and subsequently dried.

Yield: 3.10 g (96% of theory) of the compound of the formula (108b)

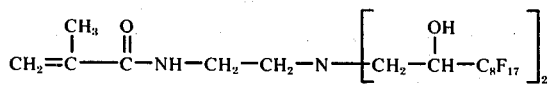

Melting point: 72° C (recrystallised from chloroform).
Analysis:
found: C 29.7; H 1.9; N 3.0. estimated: C 29.7; H 1.7; N 2.7.

EXAMPLE 9

4.35 g of 1-perfluorooctyl-2-methylamino-ethynol are dissolved in 70 ml of boiling benzene. The solution is cooled to 70° C and 0.94 g of triethylamine and a trace of hydroquinone are added. A solution of 0.67 g of fumaric acid dichloride in 10 ml of benzene is then added with stirring at 70° C. Stirring is continued for 1 hour, during which time the reaction mixture is cooled to room temperature.

The precipitate is isolated, dried, then stirred with 50 ml of water, isolated once more and dried.

Yield: 4.1 g (87% of theory) of the compound of the formula

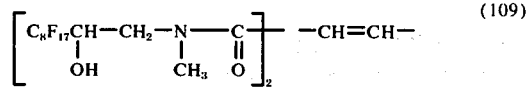

(109)

Melting point: 189° to 190° C (recrystallized from dimethyl formamide).
Analysis:
found: C 29.4; H 1.6; N 2.7. estimated: C 29.3; H 1.5; N 2.6.

EXAMPLE 10

The following (meth)acrylic amides are manufactured according to the process described in Examples 1 to 9:

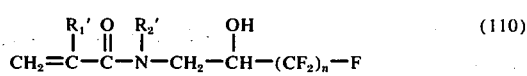

(110)

| No. | n | $R_1'$ | $R_2'$ | yield | melting point |
|---|---|---|---|---|---|
| a | 8 | $CH_3$ | $CH_3$ | 66% | 58° C |
| b | 8 | H | $C_2H_5$ | 90% | 65° C |
| c | 6, 8, 10 | H | $C_2H_5$ | 78% | — |
| d | 6, 8, 10 | H | $n\text{-}C_4H_9$ | 78% | — |
| e | 8 | H | $n\text{-}C_8H_{17}$ | 81% | boiling point: 140° C/0,001 Torr |
| f | 6, 8, 10 | H | $n\text{-}C_8H_{17}$ | 87% | — |

MANUFACTURE OF THE POLYMERS

EXAMPLE 11

A mixture of 25 parts of water, 0.6 part of dodecyltrimethylammonium chloride, 0.6 part of octadecyltrimethylammonium chloride, 5 parts of the amide of the formula (102b), 4.6 parts of methacrylic acid hexyl ester, 0.4 part of N-methylolacrylic amide and 5 parts of acetone is warmed in a nitrogen atmosphere to 60° C and treated with a solution of 0.025 parts of potassium peroxide disulphide in 1.5 parts of water and with a solution of 0.0075 part of sodium metabisulphite in 1.5 parts of water. Twenty minutes later there is again added a solution of 0.025 part of potassium peroxide disulphate in 1.5 parts of water and a solution of 0.0075 part of sodium metabisulphite in 1.5 parts of water. A finely disperse emulsion is obtained which, after 3 hours, has a resin content of 22%, corresponding to a yield of about 100%.

EXAMPLE 12

A mixture of 18 parts of water, 0.3 part of dodecyltrimethylammonium chloride, 0.3 part of octadecyltrimethylammonium chloride, 2.5 parts of the amide of the formula (104b), 2.3 parts of methacrylic acid hexyl ester, 0.2 part of N-methylolacrylic amide, 0.01 part of n-dodecylmercaptan and 2.5 parts of acetone is warmed to 70° C and treated with a solution of 0.012 part of potassium peroxide disulphate in 2.5 parts of water. Twenty minutes later a solution of 0.012 part of potassium peroxide disulphate in 2.5 parts of water is again added. A finely disperse emulsion is obtained which, after 3 hours, has a resin content of 17%, corresponding to a yield of about 100%.

EXAMPLE 13

By substituting methacrylic acid heptyl ester for methacrylic acid hexyl ester in Example 12 there is obtained a finey disperse emulsion with a resin content of 16%, corresponding to a yield of about 96%.

EXAMPLE 14

A finely disperse emulsion with a resin content of 17%, corresponding to a yield of about 100%, is obtained by carrying out the process of Example 12 but using the amine of the formula (100c).

EXAMPLE 15

A mixture of 30 parts of water, 0.6 part of dodecyltrimethylammonium chloride, 0.6 part of octadecyltrimethylammonium chloride, 9.2 parts of the amide of the formula (110d), 0.4 part of vinyl acetate, 0.4 part of N-methylolacrylic amide and 5 parts of acetone is warmed to 70° C and treated with a solution of 0.025 part of potassium peroxide disulphate in 2.5 parts of water. Twenty minutes later a solution of 0.025 part of potassium peroxide disulphate in 2.5 parts of water is again added. A finely disperse emulsion is obtained with a resin content of 19.5% after 3 hours, corresponding to a yield of about 95%.

EXAMPLE 16

A mixture of 36 parts of water, 0.6 part of dodecyltrimethylammonium chloride, 0.6 part of dodecyltrimethylammonium chloride, 5 parts of the amide of the formula (110d), 4.6 parts of methacrylic acid hexyl ester, 0.4 part of N-methylolacrylic amide, 0.02 part of n-dodecylmercaptan and 5 parts of acetone is warmed to 70° C and treated with a solution of 0.025 part of potassium peroxide disulphate in 2.5 parts of water. Twenty minutes later a solution of 0.025 part of potassium peroxide disulphate in 2.5 parts of water is again added.

A finely disperse emulsion is obtained with a resin content of 18.6% after 3 hours, corresponding to a yield of about 100%.

EXAMPLE 17

A finely disperse with a resin content of 18.5%, corresponding to a yield of about 100%, is obtained by carrying out the process of Example 16 but using the amide of the formula (110f).

APPLICATION OF THE POLYMERS

EXAMPLE 18

Cotton fabrics and polyester/cotton fabrics (63/35) are impregnated with the polymer emulsions. The amount of fluorine applied is 0.2 and 0.4 percent by weight respectively, based on the weight of the substrates. The impregnating preparations contain in addition 50 parts of a precondensate of reactant as used for crease-resistant finishing, 30 parts of a conventional extender for fluorine chemicals and 8 parts per liter of magnesium chloride hexahydrate. The fabric is dried in the air and thermofixed for 4½ minutes at 150° C.

The finished fabrics are tested for their oil repellency according to the test procedure 118–1966 T of the American of Textile Chemists and Colorists (AATCC). The repellencies are between 0 and 8, with 8 being the highest degree of repellency. The resistance of the finish is tested by washing the fabrics at 60° C with an ordinary light duty detergent.

Application liquor of the polymers:
20 to 140 parts of an emulsion of the polymers
50 parts of an aqueous 50% aqueous preparations consisting of
1 mole of hexamethylolmelaminepentamethyl ether and
1 mole of dimethylolethylene urea
30 parts of a mixture of 50 parts of paraffin and 50 parts of a fatty acid amine reaction product (fatty acid triethanolamine with 18 carbon atoms) (extender)
8 parts of magnesium chloride hexahydrate
897 to 842 parts of water.

The oil repellency values obtained are reported in the following Table.

Table 1

| Polymer according to Example | Amount of fluorine in % by weight | Oil repellency on cotton fabric | |
|---|---|---|---|
| | | without washing | after 1 wash |
| 11 | 0.2 | 4 | 4 |
| | 0.4 | 5 | 5 |
| 12 | 0.2 | 4 to 5 | 4 |
| | 0.4 | 5 | 5 |
| 13 | 0.2 | 5 to 6 | 5 |
| | 0.4 | 6 to 7 | 6 |
| 14 | 0.2 | 4 to 5 | 4 |
| | 0.4 | 5 to 6 | 5 |
| 15 | 0.2 | 5 | 4 to 5 |
| | 0.4 | 5 to 6 | 5 |
| 16 | 0.2 | 4 to 5 | 4 |
| | 0.4 | 5 to 6 | 5 |
| 17 | 0.2 | 4 to 5 | 4 |
| | 0.4 | 6 | 5 to 6 |

Table 2

| Polymer according to Example | Amount of fluorine in % by weight | Oil repellency polyester-cotton Fabric | |
|---|---|---|---|
| | | without washing | after 1 wash |
| 11 | 0.2 | 5 | 4 |
| | 0.4 | 5 | 5 |
| 12 | 0.2 | 5 | 4 to 5 |
| | 0.4 | 5 to 6 | 4 to 5 |
| 13 | 0.2 | 5 to 6 | 5 |
| | 0.4 | 6 to 7 | 6 |
| 14 | 0.2 | 4 | 3 to 4 |
| | 0.4 | 5 | 4 to 5 |
| 15 | 0.2 | 4 to 5 | 4 |
| | 0.4 | 5 | 5 |
| 16 | 0.2 | 4 | 4 |
| | 0.4 | 5 | 5 |
| 17 | 0.2 | 4 | 3 to 4 |
| | 0.4 | 5 to 6 | 5 |

We claim:

1. Fluorinated carboxylic acid amides of the formula

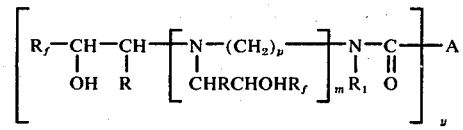

wherein $R_f$ is a perfluoroalkyl radical with 4 to 14 carbon atoms, R is hydrogen or methyl, $R_1$ is hydrogen or $R_fCHOHCHR-$, if $m$ is 1; and hydrogen, alkyl with 1 to 18 carbon atoms, cycloalkyl with 5 or 6 carbon atoms, hydroxylalkyl with 2 to 6 carbon atoms, alkoxyalkyl with 1 to 4 carbon atoms in the alkoxy moiety or $R_fCHOHCHR-$, if $m$ is 0, A is an ethylenically unsaturated hydrocarbon radical with 2 or 3 carbon atoms, $m$ is 0 or 1, $y$ is 1 or 2 and $p$ is an integer from 2 to 6.

2. Fluorinated carboxylic acid amides according to claim 1, of the formula

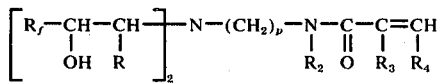

wherein $R_f$ is a perfluoroalkyl radical with 4 to 14 carbon atoms, $R_2$ is hydrogen or $R_fCHOHCHR-$, R and $R_3$ are hydrogen or methyl, $R_4$ is hydrogen, methyl or $(R_fCHOHCHR)_2N(CH_2)_pNR_2CO-$ and $p$ is an integer from 2 to 6.

3. Fluorinated carboxylic acid amides according to claim 1, of the formula

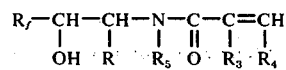

wherein $R_f$ is a perfluoroalkyl radical with 4 to 14 carbon atoms, R and $R_3$ are hydrogen or methyl, $R_4$ is hydrogen, methyl or $R_fCHOHCHRNR_5CO-$ and $R_5$ is hydrogen, alkyl with 1 to 12 carbon atoms, hydroxyalkyl with 2 to 6 carbon atoms, cycloalkyl with 5 or 6 carbon atoms or $R_fCHOHCHR-$.

4. Fluorinated carboxylic acid amides according to claim 2, of the formula

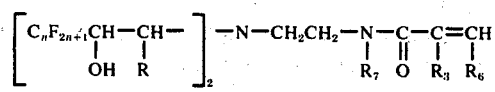

wherein R and $R_3$ are hydrogen or methyl, $R_6$ is hydrogen or $(C_nF_{2n+1}CHOHCHR)_2$—$NCH_2CH_2NR_7CO$—, $R_7$ is hydrogen or $C_nF_{2n+1}CHOHCHR$— and $n$ is an integer from 4 to 14.

5. Fluorinated carboxylic acid amides according to claim 4, of the formula

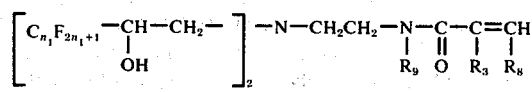

wherein $R_3$ is hydrogen or methyl, $R_8$ is hydrogen or $(C_{n_1}F_{2n_1+1}CHOHCH_2)_2$—$NCH_2CH_2NR_9CO$—, $R_9$ is hydrogen or $C_{n_1}F_{2n_1+1}CHOHCH_2$— and $n_1$ is an integer from 6 to 12.

6. Fluorinated carboxylic acid amides according to claim 5, of the formula

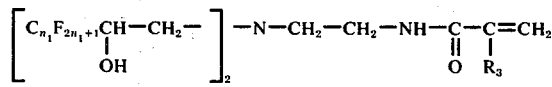

wherein $R_3$ is hydrogen or methyl an $n_1$ is an integer from 6 to 12.

7. A fluorinated carboxylic acid amide according to claim 6, of the formula

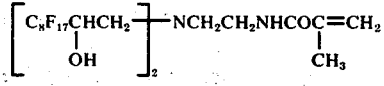

8. Fluorinated carboxylic acid amides according to claim 5, of the formula

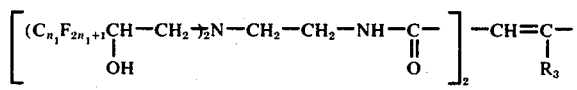

wherein $R_3$ is hydrogen or methyl and $n_1$ is an integer from 6 to 12.

9. Fluorinated carboxylic acid amides according to claim 3, of the formula

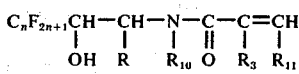

wherein R and $R_3$ are hydrogen or methyl, $R_{10}$ is hydrogen, alkyl with 1 to 8 carbon atoms, hydroxyalkyl with 2 to 6 carbon atoms, cycloalkyl with 5 or 6 carbon atoms or $C_nF_{2n+1}CHOHCHR$—, $R_{11}$ is hydrogen or $C_nF_{2n+1}CHOHCHRNR_{10}CO$— and $n$ is an integer from 4 to 14.

10. Fluorinated carboxylic acid amides according to claim 9, of the formula

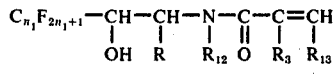

wherein R and $R_3$ are hydrogen or methyl, $R_{12}$ is hydrogen, alkyl with 1 to 8 carbon atoms, —$CH_2CH_2OH$ or $C_{n_1}F_{2n_1+1}$—$CHOHCHR$—, $R_{13}$ is hydrogen or $C_nF_{2n+1}CHOHCHRNR_{12}CO$— and $n_1$ is an integer from 6 to 12.

11. Fluorinated carboxylic acid amides according to claim 10, of the formula

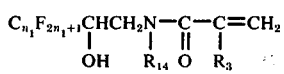

wherein $R_{14}$ is hydrogen or alkyl with 1 to 8 carbon atoms and $n_1$ is an integer from 6 to 12.

12. Fluorinated carboxylic acid amides according to claim 11, of the formulae

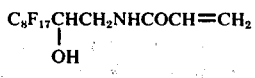

and

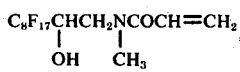

13. Fluorinated carboxylic acid amides according to claim 10, of the formula

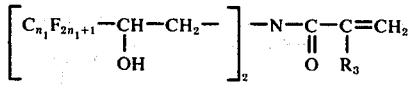

wherein $R_3$ is hydrogen or methyl and $n_1$ is an integer from 6 to 12.

14. A fluorinated carboxylic acid amide according to claim 13, of the formula

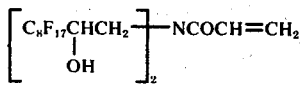

15. Fluorinated carboxylic acid amides according to claim 10, of the formula

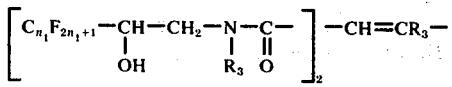

wherein $R_3$ is hydrogen or methyl and $n_1$ is an integer from 6 to 12.

16. A fluorinated carboxylic acid amide according to claim 15, of the formula

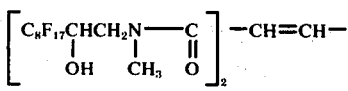

17. Polymerisation products of at least one perfluorinated carboxylic acid amide according to claim 1 and, optionally, other copolymerisable, ethylenically unsaturated monomeric compounds.

18. Homopolymers according to claim 17 which contain recurring units of the formula

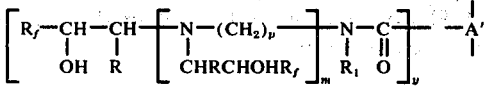

wherein $R_f$ is a perfluoroalkyl radical with 4 to 14 carbon atoms, R is hydrogen or methyl, $R_1$ is hydrogen or $R_fCHOHCHR—$, if $m$ is 1, and hydrogen, alkyl with 1 to 18 carbon atoms, cycloalkyl with 5 or 6 carbon atoms, hydroxylalkyl with 2 to 6 carbon atoms, alkoxyalkyl with 1 to 4 carbon atoms in the alkoxy moiety or $R_fCHOHCHR—$, if $m$ is 0,

is a recurring radical which is derived from an ethylenically unsaturated hydrocarbon radical with 2 to 3 carbon atoms, $m$ is 0 or 1, $y$ is 1 or 2 and $p$ is an integer from 2 to 6.

19. Homopolymers according to claim 18 which contain recurring units of the formula

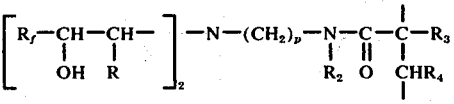

wherein $R_f$ is a perfluoroalkyl radical with 4 to 14 carbon atoms, $R_2$ is hydrogen or $R_fCHOHCHR—$, R and $R_3$ are hydrogen or methyl, $R_4$ is hydrogen, methyl or $(R_fCHOHCHR)_2N(CH_2)_pNR_2CO—$ and $p$ is an integer from 2 to 6.

20. Homopolymers according to claim 18 which contain recurring units of the formula

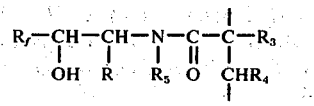

wherein $R_f$ is a perfluoroalkyl radical with 4 to 14 carbon atoms, R and $R_3$ are hydrogen or methyl, $R_4$ is hydrogen, methyl or $R_fCHOHCHRNR_5CO—$ and $R_5$ is hydrogen, alkyl with 1 to 12 carbom atoms, hydroxyalkyl with 2 to 6 carbon atoms, cycloalkyl with 5 or 6 carbon atoms or $R_fCHOHCHR—$.

21. Homopolymers according to claim 18, wherein $R_f$ is a straight-chain or a branched perfluoroalkyl radical with 6 to 12 carbon atoms.

22. Copolymers according to claim 17 which contain recurring units of the formula

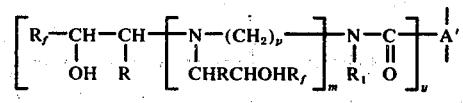

wherein $R_f$ is a perfluoroalkyl radical with 4 to 14 carbon atoms, R is hydrogen or methyl, $R_1$ is hydrogen or $R_fCHOHCHR—$, if $m$ is 1, and hydrogen, alkyl with 1 to 18 carbon atoms, cycloalkyl with 5 or 6 carbon atoms, hydroxyalkyl with 2 to 6 carbon atoms, alkoxyalkyl with 1 to 4 carbon atoms in the alkoxy moiety or $R_fCHOHCHR—$, if $m$ is 0, A' is a recurring radical which is derived from an ethylenically unsaturated hydrocarbon radical with 2 or 3 carbon atoms, $m$ is 0 or 1, $y$ is 1 or 2 and $p$ is an integer from 2 to 6, and recurring units of at least one other ethylenically unsaturated monomeric compound.

23. Copolymers according to claim 22 which contain recurring units of the formula

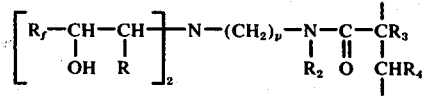

wherein $R_f$ is a perfluoroalkyl radical with 4 to 14 carbon atoms, $R_2$ is hydrogen or $R_fCHOHCHR—$, R and $R_3$ are hydrogen or methyl, $R_4$ is hydrogen, methyl or $(R_fCHOHCHR)_2N(CH_2)_pNR_2CO—$ and $p$ is an integer from 2 to 6.

24. Copolymers according to claim 22 which contain recurring units of the formula

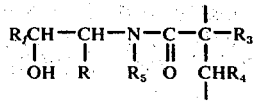

wherein $R_f$ is a perfluoroalkyl radical with 4 to 14 carbon atoms, R and $R_3$ are hydrogen or methyl, $R_4$ is hydrogen, methyl or $R_fCHOHCHRNR_5CO-$ and $R_5$ is hydrogen, alkyl with 1 to 12 carbon atoms, hydroxyalkyl with 2 to 6 carbon atoms, cycloalkyl with 5 or 6 carbon atoms or $R_fCHOHCHR-$.

25. Copolymers according to claim 22, wherein $R_f$ is a straight-chain or a branched perfluoroalkyl radical with 6 to 12 carbon atoms.

26. Copolymers according to claim 22 wherein esters, amides or methylolamides of acrylic or methacrylic acid, styrenes, vinyl halides, vinyl esters of organic acids or polymerisable olefins are used as comonomers.

* * * * *

UNITED STATES PATENT AND TRADEMARK OFFICE
CERTIFICATE OF CORRECTION

PATENT NO. : 3,996,281
DATED : December 7, 1976
INVENTOR(S) : HELMUT HUBER-EMDEN ET AL.

It is certified that error appears in the above-identified patent and that said Letters Patent are hereby corrected as shown below:

Column 18, claim 10, line 9, delete

"$C_n F_{2n+1} CHOHCHRNR_{12} CO-$" and insert ---

$C_{n_1} F_{2n_1+1} CHOHCHRNR_{12} CO-$ ---.

Column 18, claim 11, line 33, delete "n," and insert ---

$n_1$ ---.

Signed and Sealed this

Fifth Day of April 1977

[SEAL]

Attest:

RUTH C. MASON
*Attesting Officer*

C. MARSHALL DANN
*Commissioner of Patents and Trademarks*